Feb. 17, 1942.  A. A. KOTTMANN  2,273,472
CONVEYER
Original Filed April 23, 1938   2 Sheets-Sheet 1
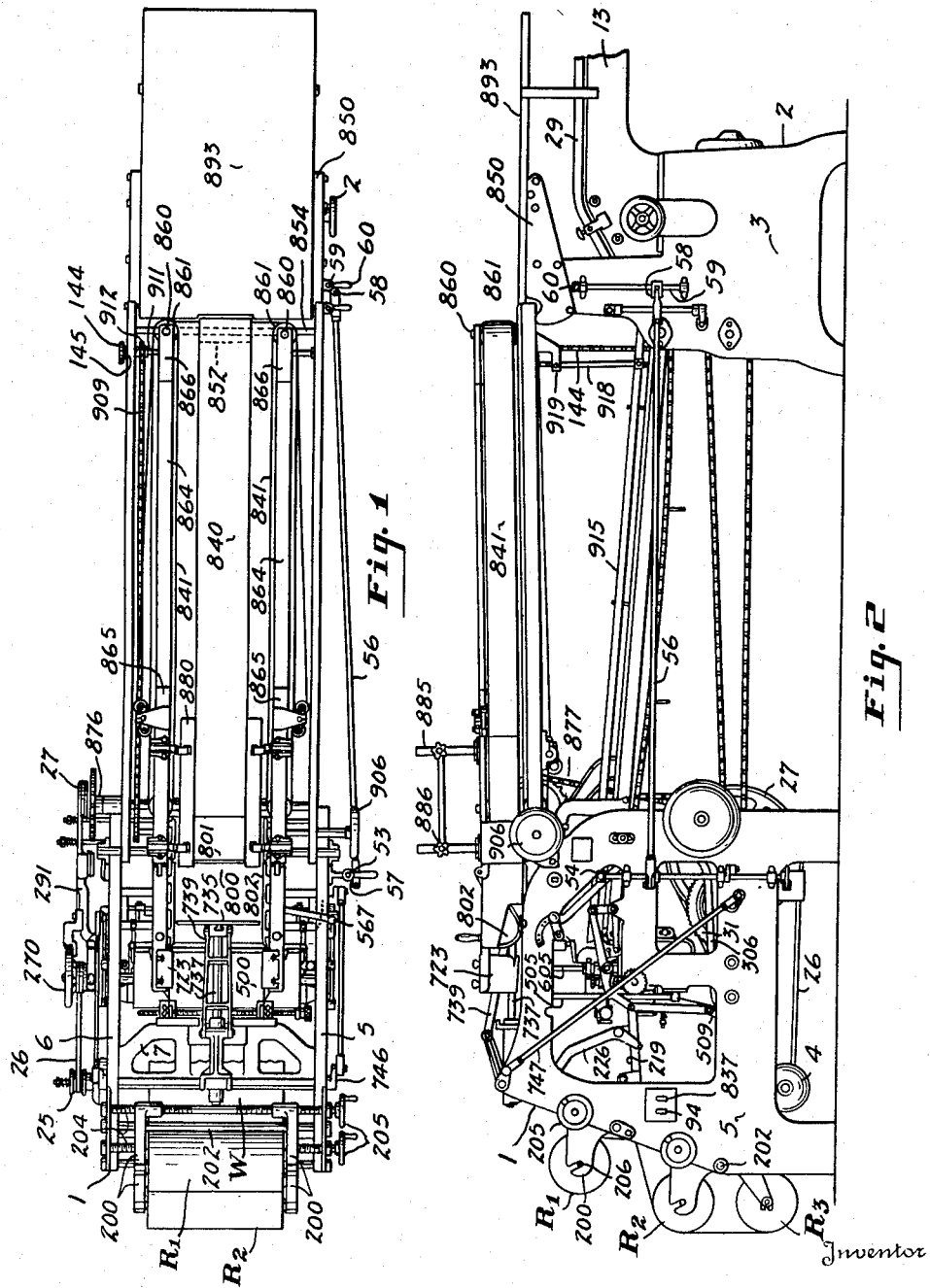
Inventor
*Arthur A. Kottmann*
By *Evans & McCoy*
Attorneys Feb. 17, 1942.   A. A. KOTTMANN   2,273,472
CONVEYER
Original Filed April 23, 1938   2 Sheets-Sheet 2

Inventor
Arthur A. Kottmann
By Evans + McCoy
Attorneys

Patented Feb. 17, 1942

2,273,472

UNITED STATES PATENT OFFICE 2,273,472

CONVEYER

Arthur A. Kottmann, Davenport, Iowa, assignor to Micro-Westco, Incorporated, Bettendorf, Iowa, a corporation of Delaware Original application April 23, 1938, Serial No. 203,865. Divided and this application September 10, 1940, Serial No. 356,169

20 Claims. (Cl. 198—168)

This invention relates to machines for packaging articles, and more particularly to loaf handling and conveying apparatus for use in the packaging of sliced bread. This application is a division of my copending application, Serial No. 203,865, filed April 23, 1938.

The customary arrangement of packaging equipment in modern bakeries includes a slicing machine and a wrapping machine coupled together so that bread, loaded onto the infeed conveyor of the slicing machine, is fed into the slicing machine and sliced, then automatically forwarded from the slicer to the wrapping machine and discharged from the latter in package form. During the slicing operation, overhanging crust portions on the ends of the bread loaves are frequently severed, forming what is known in the trade as sliver heels. These sliver heels, together with crumbs and the like resulting from the slicing process, if carried along by the loaves into the wrapping machine, may interfere with the proper wrapping of the bread, as well as cause unsightly packages.

It is therefore an object of the invention to provide, in apparatus for handling bread loaves, means for automatically separating sliver heels, crumbs, and the like from the sliced loaves so that the latter can be delivered to a bread wrapping machine free of crumbs and sliver heels and in proper form for making neat and attractive packages. More specifically, the present invention aims to provide a crumb and sliver heel eliminator associated with the conveyer which carries sliced bread loaves from the slicing machine to the wrapping machine.

Another object is to provide, in combination with a slicing machine and a wrapping machine, a sliced bread loaf conveyer having adjustable loaf supporting means adapted to underlie only the portions of the sliced bread that constitute the loaf to be packaged.

Another object is to provide a generally improved conveyer for transferring sliced bread loaves from a slicing machine to a wrapping machine, which includes means for simultaneously adjusting the article guides and the loaf supporting aprons to different widths for the purpose of accommodating bread loaves of different sizes, and means defining a transverse slot in the conveyer through which crumbs, sliver heels and the like are adapted to drop so as to be separated from the bread loaves as the latter pass over the slot.

Another object is to provide an improved loaf handling apparatus for bread slicing and wrapping machines which is simple in design and construction and inexpensive to manufacture and operate, and which may be readily adjusted to accommodate bread loaves of different size. Other objects and advantages will become apparent as the description of the invention proceeds. This description is made in connection with the accompanying drawings in which like parts are identified by the same numerals of reference throughout the several views. Although the machine illustrated and described is intended primarily for the wrapping of bread loaves, the features of the invention embodied in the particular construction and combination of parts, are applicable and advantageous for use in machines of other kinds.

In the drawings:

Figure 1 is a plan view, with parts removed, of a wrapping machine-slicing machine combination embodying the present invention;

Fig. 2 is a side elevational view, with parts removed, showing the combination illustrated in Fig. 1;

Figure 3:
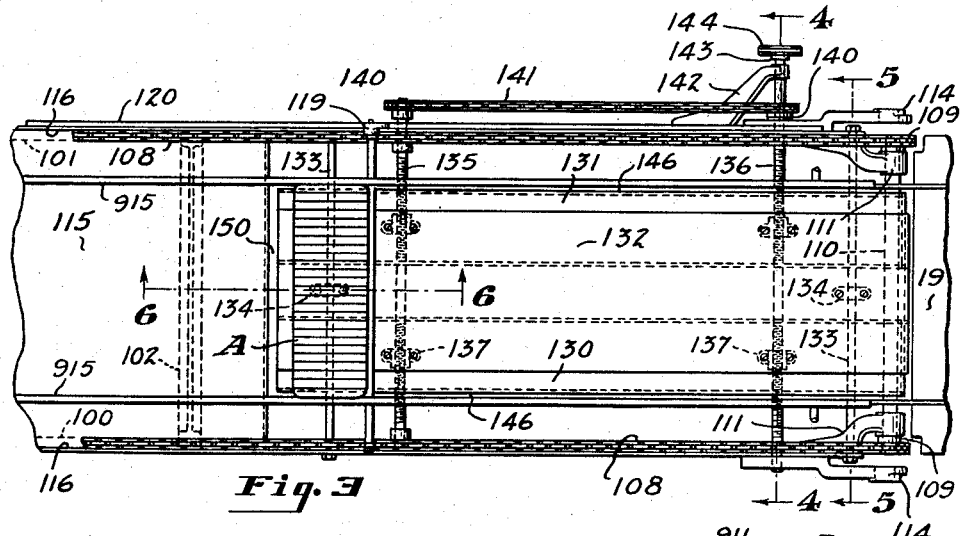
Fig. 3 is a fragmentary plan view, with parts removed, showing the crumb and sliver heel eliminator which is disposed at the receiving end of the conveyer that carries sliced bread loaves from the slicing machine to the wrapping machine.

The general combination of bread handling devices with which the apparatus of the present invention can be used is shown in Figs. 1 and 2 wherein the wrapping machine is indicated at 1, and the slicing machine is indicated at 2. The wrapping machine includes a pair of side frames 5 and 6, between which extend a plurality of cross members, one of which is indicated at 7. Reciprocable slicing blades (not shown) are suitably mounted within the side frames 3 of the slicing machine and are driven by an electric motor. The remainder of the mechanism, including all the conveyers for both the wrapping machine and the slicing machine, together with the wrapping mechanism, is driven in synchronous timed relation by a motor 4 mounted on the wrapper. A V-belt 26, driven by spring pressed split pulley 25, secured on the motor drive shaft, rotates a large pulley wheel 27 which is carried exteriorly of the wrapping machine on a drive shaft of the latter which is journaled in the side frame 6. The drive for the wrapping machine and conveyer is through a friction clutch (not shown) controlled by a hand lever 54 secured to a vertical rod 53 mounted on the side frame 5 of the wrapper and connected to the aforementioned clutch by a suitable linkage. An adjustable length tie rod 56 extends horizontally between a lever 57 secured on the rod 53 and a lever 58 secured on a vertically positioned rod 59 rotatably mounted in brackets on the side frame of the slicing machine. By means of a handle 60 secured on the rod 59, the clutch mechanism just described, which drives all the wrapping and conveying mechanisms, may be controlled from adjacent the slicing machine to facilitate one man operation of the packaging combination.

Articles to be sliced, which in this case are bread loaves, are deposited on infeed conveyer 13 of the slicing machine 2 between spaced parallel guides 29 thereof, the latter being adjustable toward and away from one another. The loaves are fed by the conveyer to and through the aforementioned slicing blades or cutters. Released from the slicing machine over its discharge plate or support member 19, Fig. 3, the sliced loaves or articles are individually engaged by the flights of the forwarding conveyer, to be later described. In the wrapping machine 1, the articles or loaves are received one at a time on a vertically reciprocable carrier 500 mounted on guides 505 and actuated through a linkage 509 driven by gear 31. Wrapping material W, which may be composed of several thicknesses of paper or the like, is contained in supply rolls R1, R2, and R3 mounted on shafts 206 carried by brackets 200 adjustably mounted on smooth rods 202. The brackets 200 may be moved along the shafts 202 toward and away from one another by means of rotatable rods 204, having oppositely threaded ends threaded in the brackets 200 and provided with hand wheels 205, by means of which the rods can be rotated.

The wrapping material W is advanced by feed rolls controlled by a clutch structure mounted on a shaft having a hand wheel 270, the clutch being engaged and disengaged by means of a lever 291 which is shifted in response to the movement of the wrapping mechanism and a control described in my above identified application. Suitable lengths of the wrapping material W, advanced over supporting tray 219 and tensioned by means of a roller carried on arms 226, are severed therefrom by a cutter movable on guides 605, and the severed wrapping material is positioned in front of the advancing loaf by means of carrier bars actuated by a link 306.

As the partially wrapped loaves are individually elevated by the carrier 500, the projecting end portions of the wrapping material are folded downwardly by top end folders 723. At the upper limit of movement of the carrier, the loaf mounted thereon is pushed into the folding and sealing channel of the wrapper by a pusher 735 mounted on a ram 737 which is actuated by a link 739 connected to an arm 742. This arm is actuated by a lever 746 oscillated by means of a linkage 747 connecting the same to the shaft on which the drive gear 31 is mounted. After each loaf is pushed into the folding and sealing channel, the wrapper is drawn snugly underneath the same by a wrapper tensioning mechanism under the control of a lever 567.

Bottom plate 800 of the sealing channel is heated, and heated folders 802 are provided for folding projecting portions of the wrapping material against the ends of the article. If desired, a supplemental bottom heating plate 801 may be provided to heat the overlapped wrapped portions on the bottom of the article. The heaters are electrical and are controlled by a switch 837 mounted on the machine frame. The wrapped articles discharged from the folding and sealing channel are received on a bottom conveyer belt 840 and between side conveyer belts 841. The latter are carried around rotatable members 861 supported by vertical spindles 860. If desired, cooling tanks 864 may be provided which are carried by support members 865 and 866.

The spindles 860 at the slicing machine end of the belt discharge conveyer, as well as similar spindles at the wrapping machine end thereof, are mounted for movement toward and away from one another on transverse or cross shafts, one of which is indicated at 854. The movement of the spindles 860 toward and away from one another is controlled by a threaded shaft 911 rotated by a sprocket 912 secured thereon and having a chain belt 909 trained thereover. A similar arrangement is provided at the wrapping machine end of the discharge conveyer.

The chain belt 909 is actuated by a sprocket (not shown) secured on the shaft corresponding to the shaft 911 and which is disposed at the wrapping machine end of the discharge conveyer. This shaft carries a hand wheel 906, by means of which the same may be rotated so that the side belts 841 can be adjusted toward and away from one another while maintained in parallelism. The belts 840 and 841 of the discharge conveyer are driven by a sprocket 876 which has a chain 877 trained thereover, the latter being actuated by a driven sprocket (not shown) actuated by the pulley 27.

As wrapped articles are moved into the discharge conveyer channel, the tops thereof are engaged by holddowns 880 swingably mounted on uprights 885 and vertically adjustable by means of hand wheels 886. Articles released from the discharge conveyer are received on a platform 893 carried by extensions 850 of the slicing machine frame.

By means of the combination briefly described above, and which is more fully explained in my copending application previously mentioned, a single operator stationed adjacent the slicing machine 2 can load unsliced bread loaves on the infeed conveyer 13 and unload the wrapped sliced loaves from the platform 893. In the movement of the articles or loaves from the infeed conveyer 13 to the receiving tray 893 through the slicing and wrapping instrumentalities, the slicing and wrapping operations are entirely automatic and usually not even observed by the operator, who is fully occupied in loading and unloading the apparatus. It is therefore of paramount importance that the slicing and wrapping be performed as accurately as possible and without interruption. Furthermore, it is important that the completed packages be neat in appearance and free from unnecessary crumbs and sliver heels.

In order to provide for elimination of the crumbs and sliver heels, the discharge conveyer of the slicing machine, which also serves as the infeed conveyer of the wrapping machine, is built as illustrated in Figs. 3 through 6. The conveyer comprises spaced parallel supporting or side frame members 100 and 101 which may be suitably formed of metal channels disposed in opposed relation to one another with vertical web portions and inwardly disposed flanges, so that the channels of the members open towards one another. The ends of the supporting members 100 and 101 are carried by the side frames 3 of the slicing machine and the side frames 5 and 6 of the wrapping machine. One or more cross members such as indicated at 102 may be used to connect the side frame members 100 and 101.

Conveyer side chains or belts 108 are disposed in spaced parallel relation and are endless. These chains are carried by rotatable members mounted at the ends of the conveyer and are driven by the motor 4 of the wrapper through suitable means (not shown). At the slicing machine end of the forwarding conveyer the rotatable members around which the chains are trained include a pair of spaced sprockets 109 carried by a transverse shaft 110. This shaft is journaled in fittings 111 carried by the side frame members 100 and 101 and which engage the shaft inwardly of the sprockets. A shaft and sprockets (not shown) are provided at the wrapping machine end of the forwarding conveyer for supporting the endless side chains 108 and correspond to the shaft 110 and the sprockets 109 just described. The ends of the frame or support members 100 and 101 adjacent the slicer have brackets 114 secured on the outside thereof. These brackets are supported on the inside of the slicing machine frames 3.

Extending between and carried by the uppermost flanges of the supporting members 100 and 101 is an article supporting apron 115 disposed at the wrapping machine end of the conveyer. The side marginal portions of the apron are bent or formed to extend upwardly to provide rails 116 parallel to the supporting members 100 and 101. The end of the apron 115 at the wrapping machine end of the forwarding conveyer is referred to as the infeed station of the wrapping machine since it is here that articles first engage the wrapping material W and are then moved onto the reciprocable carrier 500.

The endless conveyer belts or chains 108 carry between them at uniformly spaced intervals transverse flights 117 having auxiliary upstanding pusher plates or elements 118. These pusher plates may have cutaway portions, indicated at 121, to clear the loaf measuring fingers (not shown) of the paper feeding mechanism. The flights 117 are journaled in extensions of special link elements of the chains 108 and are rotatably carried above and in spaced relation with respect to the apron 115 of the conveyer.

As each flight is carried around the sprockets 109 at the slicing machine end of the conveyer, the auxiliary pusher 118 thereof trails the main flight 117 so that the latter may pass closely adjacent the underside of the discharge plate 19 of the slicing machine. Secured to one end of each of the flights 117 is a cam lever 119 which rides upon a track 120 extending longitudinally of the conveyer over the supporting member 101. The cam lever and track cooperate to rotate the flight to elevate the flight pusher portion or auxiliary plate 118 after it passes the discharge plate 19 and retain the flight in an upright position while the article is advanced thereby.

Each article discharged from the slicing machine is engaged by one of the flights 117 and is advanced thereby a short distance toward the wrapping machine prior to the rotation of the auxiliary pushers 118 into upright article contacting position. This elevation of the auxiliary pushers serves to thrust forward articles that may be riding on top of the flights, so that the articles are positively moved along the conveyer apron or aprons in advance of the flights. The auxiliary pushers 118 remain in engagement with the articles until the latter are received by the carrier 500 of the wrapping mechanism. The auxiliary pushers extend for a substantial distance above the apron or aprons of the forwarding conveyer and provide a firm support for a large portion of the rear side of each article being advanced.

The crumb and sliver heel eliminator comprises a pair of longitudinally extending article supporting plates or aprons 130 and 131 which are laterally adjustable and telescopically arranged beneath and in lapping relation to a fixed central longitudinally extending apron or plate 132. The plates or apron members 130, 131 and 132 receive the sliced loaves directly from the discharge plate or apron 19 of the slicing machine and support the loaves as they are advanced toward the conveyer apron 115. The central apron or plate 132 is supported on cross bars 133 which extend transversely of the forwarding conveyer and have their ends secured to the longitudinal supporting members 100 and 101. Spacing members 134 are mounted on the centers of the bars 133 and are secured to central portions of the underside of the plate 132 so as to carry the latter in elevated or spaced relation with respect to the bars 133. The side members or plates 130 and 131 are disposed between the apron 132 and the bars 133 and are carried on shafts 135 and 136 having oppositely threaded ends which receive threaded blocks or members 137 secured to the underside of the plates 130 and 131. The shafts 135 and 136 are journaled in the longitudinal support members 100 and 101 and one end of each shaft extends through the support 101 to receive a sprocket 140 which is secured thereon. A chain 141 is trained over the sprockets 140 so that the shafts 135 and 136 may be rotated in synchronism.

A bracket 142, secured to the supporting member 101, journals an extended portion of the shaft 136 which has a sprocket 143 secured thereto. A chain 144 is trained around the sprocket 143 and a sprocket 145, Fig. 1, secured on the shaft 911 of the discharge conveyer previously described. Thus, the chain 144 is arranged to rotate the shafts 135 and 136 simultaneously with the rotation of the shafts which adjust the distance between the side belts 841 of the discharge conveyer. Accordingly, the plates or aprons 130 and 131 may be moved toward and away from one another beneath the central supporting plate 132 synchronously with the movement of the side belts 841 of the discharge conveyer. Thus, the effective article supporting width of the combined plates 130, 131 and 132 may be adjusted to articles of different lengths so that outer marginal edges 146 of the plates may be disposed to underlie the end slices or heels of one of the loaves A being advanced over the forwarding conveyer. When the plates or aprons are so adjusted, crumbs or sliver heels lying beyond the ends of the loaves discharged from the plate 19 of the slicing machine drop below the level of the conveyer aprons into a suitable receptacle (not shown).

Figure 6:
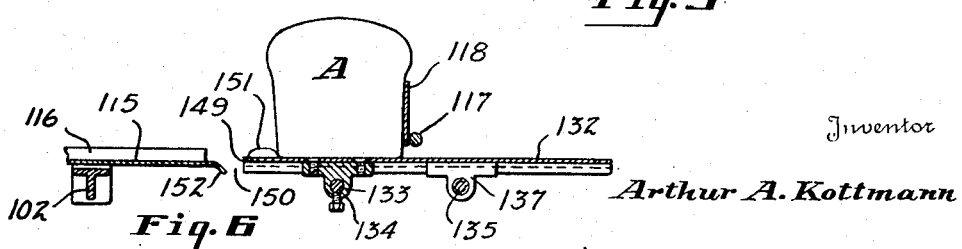
Fig. 6 is a fragmentary detail in section taken longitudinally through the conveyer substantially on the line 6—6 of Fig. 3.

The discharge ends 149 of the plates or aprons 130, 131 and 132 are spaced from receiving end 152 of the apron 115, as shown in Fig. 6, to provide a transverse slot 150 extending across the entire width of the forwarding conveyer. Crumbs and sliver heels such as indicated at 151 and which are carried forward over the aprons or plates 130, 131 and 132, drop through the slot or opening 150 into a suitable receptacle instead of being carried along with the article to be wrapped therewith or to interfere with the packaging process. Preferably, the receiving edge 152 of the apron 115 is rounded or bent downwardly to engage the leading bottom edges of the loaves and guide or direct the loaves onto the apron 115, thus preventing snagging or catching of the loaves on the edge of the apron.

Side guides or rails 915 are disposed in spaced parallel relation above the edges 146 of the aprons or plates 130 and 131 and extend longitudinally of the forwarding conveyer. If desired, these guides may be continuous from the discharge plate 19 of the slicing machine to the infeed station of the wrapping machine, passing over the portion of the forwarding conveyer formed by the adjustable or lapped aprons and also that portion formed by the apron 115. The guides or rails 915 may be formed of channel members having the channels facing outwardly so that the flat web portions engage the ends of the articles. The guide rails 915 are mounted on the bottom ends of vertically disposed adjustable rods 918 at the slicing machine end of the apparatus and on similar rods (not shown) at the wrapping machine end of the apparatus. The rods are adjustably carried in brackets 919 which are movable with the spindles 860 of the belt discharge conveyer structure. Accordingly, as the side belts 841 of the discharge conveyer are moved toward or away from one another by means of the hand wheel 906 for the purpose of adjusting the mechanism to accommodate articles of different length, the space between the guide rails 915 is automatically adjusted in synchronism therewith. Furthermore, and as previously described, the chain 144 actuates the threaded rods 135 and 136 so as to move the aprons 130 and 131 toward and away from one another in synchronism with the guide rails 915 and the side belts 841 of the discharge conveyer.

Figure 4:
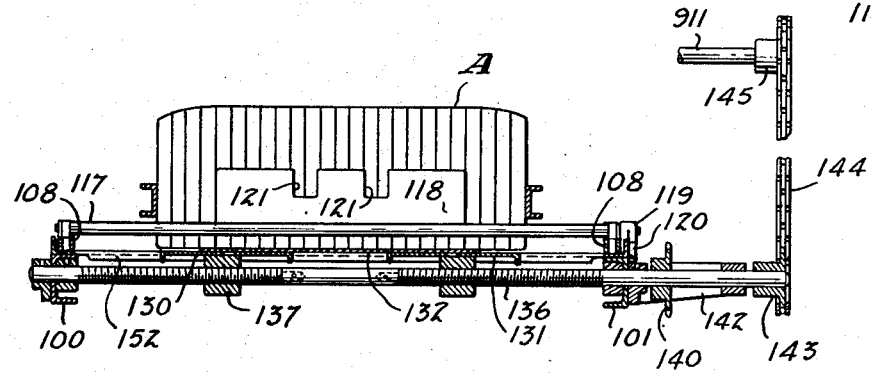
Fig. 4 is a transverse vertical sectional view taken substantially on the line 4—4 of Fig. 3.
Figure 5:
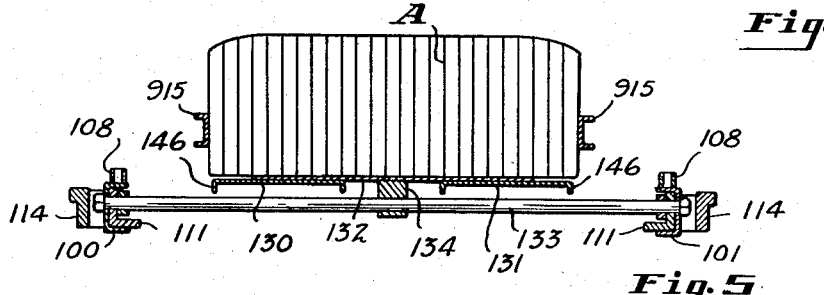
Fig. 5 is a transverse vertical sectional view taken substantially on the line 5—5 of Fig. 3.

As shown in Figs. 3 through 5, the adjustment of the parts is such that the space between the guide rails 915 is approximately equal to the space between the turned-under edges 146 of the adjustable aprons 130 and 131. Preferably, the edges 146 of the adjustable aprons may be maintained slightly closer together than the distance between the rails 915, so that the ends of articles moving over the crumb and sliver heel eliminator project slightly beyond the edges of the aprons. In this manner the discharge of all crumbs and sliver heels from the aprons 130, 131 and 132 is assured. These aprons are slidingly arranged with respect to one another and can be adjusted to move the edges 146 closer together or further apart while being maintained in parallelism.

The principles of the present invention may be utilized in various ways, numerous modifications and alterations being contemplated, substitution of parts and changes in construction being resorted to as desired, it being understood that the embodiments shown in the drawings and described above are given merely for purposes of explanation and illustration without intending to limit the scope of the claims to the specific details disclosed.

What I claim is:

1. A conveyer for carrying sliced bread loaves from a slicing machine, said conveyer having an apron for supporting the loaves, and opposite substantially parallel edge portions of the conveyer apron being movable toward and away from one another in parallelism to adjust the effective article supporting width of the apron to loaves of different size.

2. A conveyer for carrying sliced bread loaves from a slicing machine, said conveyer having an apron for supporting the loaves, spaced substantially parallel article guide means above the conveyer apron, means for varying the space between the guides, means for varying the effective loaf supporting width of the conveyer apron, and means effecting simultaneous adjustment of the guide space varying means and apron width varying means.

3. A conveyer for carrying sliced articles from a slicing machine, said conveyer having an apron for supporting the articles, and a portion of the apron comprising a pair of members in underlying supporting relation with respect to the articles, said members being movable toward and away from one another and each having an edge portion substantially paralleling the path of the articles.

4. A conveyer for carrying sliced articles from a slicing machine, said conveyer having an apron for supporting the articles, a portion of the apron comprising a pair of members in underlying supporting relation with respect to the articles, said members being movable toward and away from one another and each having an edge portion substantially paralleling the path of the articles, article guides disposed above the conveyer apron and movable toward and away from one another to accommodate articles of different sizes, means for adjusting the article guides, and means associated with said guide adjusting means for moving said members in synchronism with the guides and simultaneously therewith.

5. In bread handling apparatus, an adjustable conveyer apron comprising a number of flat, elongated loaf supporting members disposed in overlapping relation to one another and with the outer edges of the members in spaced parallel relation to one another, and means for moving at least one of the members relative to the other to vary the spacing between said edges while maintaining said parallel relation to adjust the members for bread loaves of different sizes.

6. In bread handling apparatus, a conveyer for sliced loaves comprising overlapped aprons for supporting the loaves, spaced parallel adjustable guides for engaging the ends of loaves moving over the aprons to center the same thereon, pusher means for advancing the loaves sideways over the aprons with the ends of the loaves in contact with the guides, and means for adjusting the aprons to position the outer edges thereof approximately the same distance apart as the guides.

7. In bread handling apparatus, a conveyer for sliced loaves comprising overlapped aprons for supporting the loaves, spaced parallel adjustable guides for engaging the ends of loaves moving over the aprons to center the same thereon, spaced, substantially parallel belts, a plurality of flights carried between the belts, means for supporting and actuating the belts to move the flights over the aprons for advancing the sliced bread loaves sideways thereover and with the ends of the loaves in contact with the guides, and means for adjusting the aprons to position the outer edges thereof approximately the same distance apart as the guides.

8. In bread handling apparatus, a conveyer comprising apron means for supporting sliced loaves advancing sideways thereover, said means having spaced, substantially parallel side edges extending longitudinally thereof, means for supporting the apron means with said edges substantially free and unobstructed to permit crumbs and sliver heels carried from the slicing machine by the loaves to be discharged laterally therefrom, guide rails and means supporting the same in spaced parallel relation to one another and above the apron means, the guide rail spacing being approximately equal to the width of the apron means between the side edges of the latter, and means for pushing sliced loaves, received from the slicing machine on the apron means, sideways over the latter between the guide rails whereby the loaves are advanced with the loaf ends moving along the edges of the apron means and crumbs and sliver heels from the loaves are discharged laterally from the edges of the apron means and under the guide rails.

9. In bread handling apparatus a conveyer comprising first apron means for supporting sliced loaves advancing sideways thereover, said means having spaced, substantially parallel side edges extending longitudinally thereof, means for supporting the apron means with said edges substantially free and unobstructed to permit crumbs and sliver heels carried from the slicing machine by the loaves to be discharged laterally therefrom, guide rails and means supporting the same in spaced parallel relation to one another and above the apron means, the guide rail spacing being approximately equal to the width of the apron means between the side edges of the latter, second apron means extending as a continuation of the first apron means and separated therefrom by an air gap across substantially the entire width of the first apron means, said gap providing an escape for crumbs and the like which are pushed along the first apron means by advancing loaves and drop by gravity off the end thereof, said guide rails being continuous over the gap and the second apron means, and means for pushing sliced loaves from the slicing machine sideways over the first and second apron means between the guide rails whereby the loaves are advanced with the loaf ends moving along the edges of the first apron means.

10. In bread handling apparatus a conveyer comprising first apron means for supporting sliced loaves advancing sideways thereover, said means having spaced, substantially parallel side edges extending longitudinally thereof, means for supporting the apron means with said edges substantially free and unobstructed to permit crumbs and sliver heels carried from the slicing machine by the loaves to be discharged laterally therefrom, guide rails and means supporting the same in spaced parallel relation to one another and above the apron means, the guide rail spacing being approximately equal to the width of the apron means between the side edges of the latter, second apron means extending as a continuation of the first apron means and separated therefrom by an air gap across substantially the entire width of the first apron means, said gap providing an escape for crumbs and the like which are pushed along the first apron means by advancing loaves and drop by gravity off the end thereof, said guide rails being continuous over the gap and the second apron means, the end edge of the second apron means along the gap being inclined downwardly to underlie and guide the leading edge of an advancing loaf onto said second apron means, and means for pushing sliced loaves from the slicing machine sideways over the first and second apron means between the guide rails whereby the loaves are advanced with the loaf ends moving along the edges of the first apron means.

11. In bread handling apparatus a conveyer comprising first apron means for supporting sliced loaves advancing sideways thereover, said means having spaced, substantially parallel side edges extending longitudinally thereof, means for supporting the apron means with said edges substantially free and unobstructed to permit crumbs and sliver heels carried from the slicing machine by the loaves to be discharged laterally therefrom, guide rails and means supporting the same in spaced parallel relation to one another and above the apron means, the guide rail spacing being approximately equal to the width of the apron means between the side edges of the latter, second apron means extending as a continuation of the first apron means and separated therefrom by an air gap across substantially the entire width of the first apron means, said gap providing an escape for crumbs and the like which are pushed along the first apron means by advancing loaves and drop by gravity off the end thereof, said guide rails being continuous over the gap and the second apron means, and means for pushing sliced loaves from the slicing machine sideways over the first and second apron means between the guide rails whereby the loaves are advanced with the loaf ends moving along the edges of the first apron means, said pushing means comprising flights and means mounting the same for movement over the apron means, the flights each being of greater length than the width of the first apron means and their ends extending laterally under the guide rails and beyond the side edges of said first apron means.

12. In bread handling apparatus, a conveyer for forwarding sliced loaves comprising a pair of loaf supporting aprons having spaced, substantially parallel outside edges, a pair of spaced guide rails and means mounting the same above and in approximate parallelism with the edges of the aprons, and means for simultaneously shifting the aprons laterally to move the edges toward and away from one another while maintaining the same in parallelism.

13. In bread handling apparatus, a conveyer for forwarding sliced loaves comprising a pair of loaf supporting aprons having spaced, substantially parallel outside edges, a pair of spaced guide rails and means mounting the same above and in approximate parallelism with the edges of the aprons, means for simultaneously shifting the aprons laterally to move the edges toward and away from one another while maintaining the same in parallelism, and means movable over the aprons to advance loaves thereon between the rails.

14. In bread handling apparatus, a conveyer for forwarding sliced loaves comprising a pair of loaf supporting aprons having spaced, substantially parallel outside edges, a pair of spaced guide rails and means mounting the same above and in approximate parallelism with the edges of the aprons, means for simultaneously shifting the aprons laterally to move the edges toward and away from one another while maintaining the same in parallelism, and flights having means for moving the same over the aprons to advance loaves thereover between the rails, said flights being of greater length than the widest possible spacing of the apron edges and being disposed for movement underneath the rails throughout their loaf advancing path.

15. In bread handling apparatus, a conveyer for forwarding sliced loaves comprising a pair of loaf supporting aprons having spaced, substantially parallel outside edges, a pair of spaced guide rails and means mounting the same above and in approximate parallelism with the edges of the aprons, and means mounting the aprons for simultaneous lateral shifting to move the edges toward and away from one another, said last named means including a rod having oppositely threaded ends and members secured to the aprons and threaded on the rod ends.

16. In bread handling apparatus, a conveyer for forwarding sliced loaves comprising a pair of loaf supporting aprons having spaced, substantially parallel outside edges, a pair of rods disposed transversely of the aprons and in spaced parallel relation to one another, said rods having oppositely threaded ends, members secured to the underside of the aprons and threaded on the rod ends, and means for rotating the rods to move the members and the apron edges toward and away from one another.

17. In bread handling apparatus, a conveyer for forwarding sliced loaves comprising a pair of loaf supporting aprons having spaced, substantially parallel outside edges, a pair of rods disposed transversely of the aprons and in spaced parallel relation to one another, said rods having oppositely threaded ends, members threaded on the rod ends and connected to longitudinally spaced portions of the aprons, and means for rotating the rods in synchronism to shift the aprons laterally and to thereby move the apron edges toward and away from one another while maintaining such edges in parallelism.

18. In bread handling apparatus, a conveyer for forwarding sliced loaves comprising a pair of loaf supporting aprons having spaced, substantially parallel outside edges, a pair of rods disposed transversely of the aprons and in spaced parallel relation to one another, said rods having oppositely threaded ends, members threaded on the rod ends and connected to longitudinally spaced portions of the aprons, means for rotating the rods in synchronism to shift the aprons laterally and to thereby move the apron edges toward and away from one another while maintaining such edges in parallelism, a pair of spaced guide rails and means mounting the same above the apron edges and for movement toward and away from one another whereby the spacing between the guides can be corelated to the spacing of the apron edges.

19. In bread handling apparatus, a conveyer for forwarding sliced loaves comprising a pair of spaced side members, cross members extending between the side members, a central loaf supporting apron mounted on the cross members, a pair of side aprons each disposed in lapping relation to the central apron and having spaced parallel side edges, said cross members including a pair of rods having oppositely threaded ends, threaded members mounted on the rod ends and having connection with the side aprons, spaced guide rails disposed above and in parallelism with the apron edges, means mounting the rails for movement toward and away from one another, and means for simultaneously actuating the rods and the rail mounting means to shift the side aprons and the rails in synchronism whereby the space between the apron edges is maintained in definite relation to the space between the rails.

20. A conveyer for receiving and advancing sliced bread loaves comprising apron means for supporting the loaves and having spaced marginal side edges, and means for varying the effective loaf supporting width of the apron means by movement of said edges toward and away from one another to adjust the conveyer for loaves of various sizes so that advancing loaves move over the conveyer with opposite ends of the loaves closely adjacent the marginal edges of the apron means.

ARTHUR A. KOTTMANN.